E. A. G. ROULSTONE.
CORNER-CLAMPS OR PROTECTORS FOR TRUNKS.
No. 7,149. Reissued May 30, 1876.
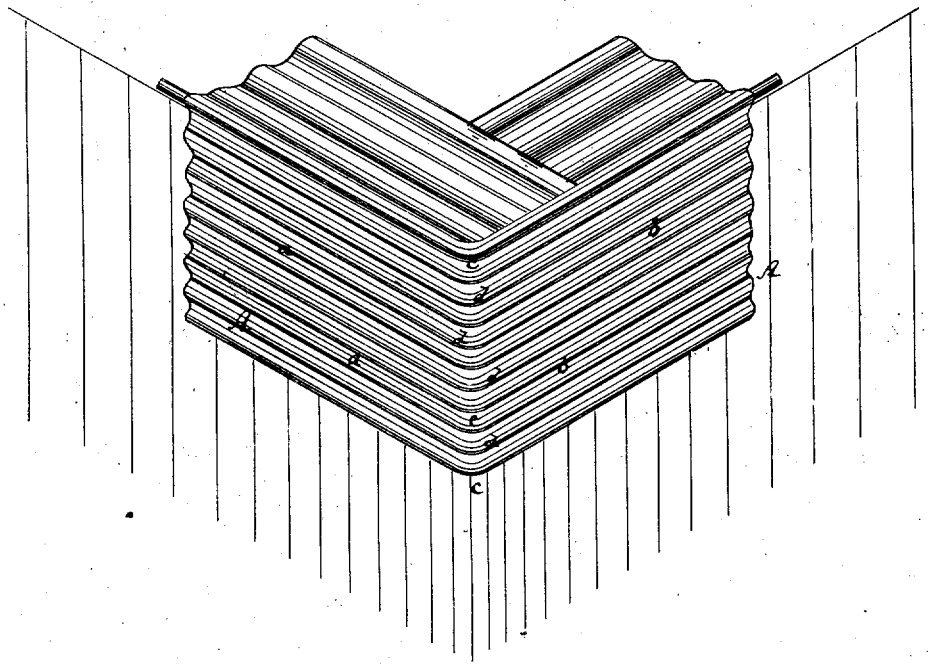
*Witnesses:*
A. Moraga
Ernest E. Webb
*Inventor:*
E. A. G. Roulstone
by his attorney
A. v. Briesen

UNITED STATES PATENT OFFICE.

EDWARD A. G. ROULSTONE, OF BOSTON, MASSACHUSETTS, ASSIGNOR TO M. GOULD'S SONS.

IMPROVEMENT IN CORNER CLAMPS OR PROTECTORS FOR TRUNKS.

Specification forming part of Letters Patent No. 59,458, dated November 6, 1866; reissue No. 7,149, dated May 30, 1876; application filed April 22, 1876.

*To all whom it may concern:*

Be it known that I, EDWARD A. G. ROULSTONE, formerly of Roxbury, in the State of Massachusetts, but at present residing in Boston, State of Massachusetts, have invented a new and Improved Corner-Clamp for Trunks, of which the following is a specification:

The drawing represents a perspective view of the improved trunk-corner clamp.

This invention relates to a new manner of protecting or re-enforcing the corner of a traveling-trunk by a metal cap or clamp, and to the new construction of such metal clamp, as an article of manufacture.

The invention consists principally in so bending or bulging the said metallic clamp at the corner that it will partly bear against and partly be raised off the corner of the trunk. Such a bent or bulged clamp, when applied to the corner of a trunk, will protect it against injury, even under the rough treatment to which trunks are subjected by express and baggage men. Any blow received upon the corner-clamp is imparted, not directly to the trunk, but to the projecting hollow bead of the clamp, and the trunk is consequently preserved from injury.

The corner-clamp represented in the drawing is so shaped as to protect two sides and the top of a trunk. The wings *a* and *b*, which are placed against the two sides of the trunk, meet at the proper angle at the corner *c*, and are made of a single piece of metal, which at the corner *c* is bent or bulged outward, with corrugations or beads, as at *d d*, each bulge or bead *d* being convex on its outer and concave on its inner side, so that thus, along the line of the trunk-corner *c*, the clamp A will partly bear against and partly be raised off said corner. Under every bead *d* a corresponding open space is formed between the corner-clamp and the body of the trunk. A blow received on such a bead, *d*, will not affect the body of the trunk, being taken up by the convex bead, which, owing to its form, is elastic, and not in direct contact with the trunk.

Wherever a bead, *d*, extends beyond the corner, along one of the wings *a* or *b*, it serves also as a protection against blows received by the corresponding side of the corner-clamp, and my improvement therefore presents to manufacturers of traveling-trunks a cheap and reliable means of improving and strengthening their productions.

I claim as my invention—

1. The corner-clamp A, made with the outwardly-projecting bead *d* at the corner, said bead being convex at the outer and concave at the inner side, substantially as herein shown and described.

2. The corner-clamp, corrugated substantially as herein described, as a new article of manufacture.

E. A. G. ROULSTONE.

Witnesses:
P. E. TESCHEMACHER.
N. W. STEARNS.